Figure 1:
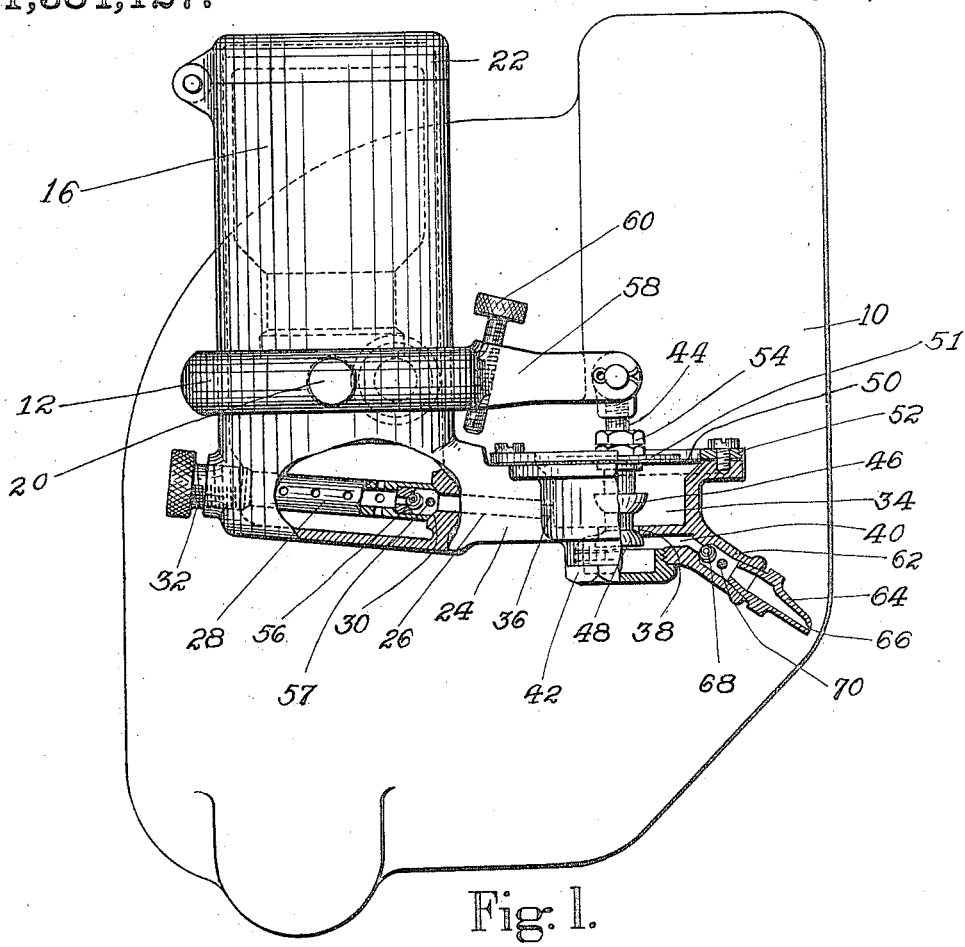

F. M. FURBER.
DISPENSING DEVICE.
APPLICATION FILED MAY 7, 1917.

1,384,127.

Patented July 12, 1921.

INVENTOR-
Frederick M. Furber
By his Attorney,
Nelson N. Howard

UNITED STATES PATENT OFFICE.

FREDERICK M. FURBER, OF REVERE, MASSACHUSETTS, ASSIGNOR, BY MESNE ASSIGNMENTS, TO UNITED SHOE MACHINERY CORPORATION, OF PATERSON, NEW JERSEY, A CORPORATION OF NEW JERSEY.

DISPENSING DEVICE.

1,384,127. Specification of Letters Patent. Patented July 12, 1921.

Application filed May 7, 1917. Serial No. 166,939.

*To all whom it may concern:*

Be it known that I, FREDERICK M. FURBER, a citizen of the United States, residing at Revere, in the county of Suffolk and State of Massachusetts, have invented certain Improvements in Dispensing Devices, of which the following description, in connection with the accompanying drawings, is a specification, like reference characters on the drawings indicating like parts in the several figures.

This invention relates to dispensing devices for liquids and particularly to a dispensing device adapted to contain a quantity of relatively thick or viscous liquid which it is desired to use in small quantities.

In repairing the cracks which sometimes appear around the toe portion of the upper of patent leather shoes during their manufacture, a heavy liquid known as "tip repairing enamel" is applied. This liquid is very sticky and dries quickly upon exposure to the air. In the attempt to overcome the inherent difficulties of handling machine liquid various dispensing devices have been devised for the purpose, two of which are disclosed in my prior Patents No. 1,096,423 granted May 12, 1914, and No. 1,202,989 granted Oct. 31, 1916. In one of its aspects, the present invention consists in improvements upon the devices of my earlier patents whereby I provide a dispensing device in which a predetermined quantity of liquid is positively and quickly expelled from the outlet of the receptacle, and dripping during the intervals between periods of use is prevented by positively closing said outlet. My preferred embodiment of this invention provides an arrangement in which the flow of liquid from the outlet of the receptacle is independent of the head of liquid therein, control of the flow of liquid being obtained by means for closing the outlet passage against delivery and for positively expelling liquid from the outlet constructed and arranged to be operated at the will of the operative.

In another aspect, my invention consists in so arranging the outlet controlling mechanism of dispensing devices that great accuracy of manufacture is not necessary. My invention further contemplates controlling mechanism so constructed and arranged that the use of springs may be obviated. In view of the liability of variation in springs intended to be alike, this latter feature is of considerable advantage and becomes even more important in view of the fact that it has been found that the operatives are apt to remove or alter such springs to suit their own convenience with a resulting detriment to the proper operation of the device. Accordingly, an important feature of the invention relates to the arrangement of the device whereby the control of the flow of liquid is determined by the action of gravity upon a pivoted element of fixed weight with the result that springs are eliminated and the closing made positive and complete.

A feature of the device relates to the arrangement of parts whereby the relatively movable members for controlling the flow of liquid are inclosed within the outlet passage of the receptacle thereby avoiding difficulties due to the exposure to the air of moving parts which are liable to be covered with enamel.

Further features of the invention relate to the particular arrangement of the parts of the device whereby the desired result is obtained, as will be more fully described in the specification and set out in the appended claims.

For convenience, I shall herein refer to the liquid in question as enamel but it will be evident that my device is not restricted to use with this particular liquid but is equally applicable for use with other liquids in a similar way.

In the accompanying drawings,—

Figure 2:
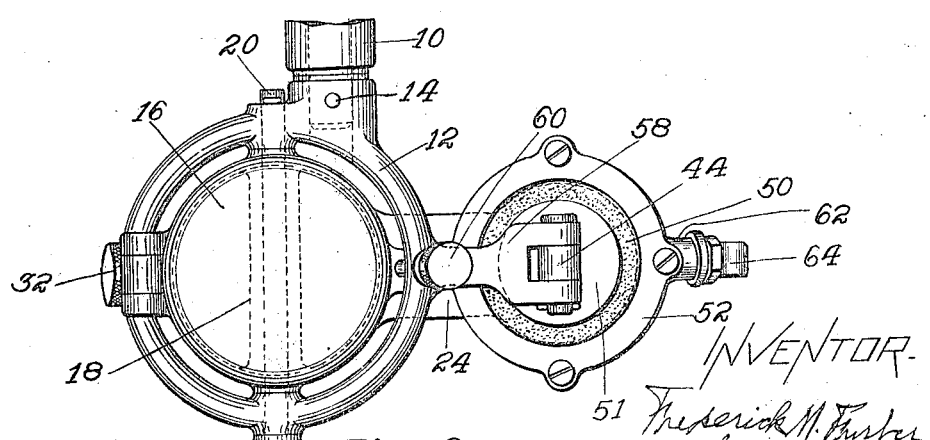

Figure 1 is a side elevation, partly in section, of my improved dispensing device; and Fig. 2 is a plan view thereof.

My device is mounted upon any suitable support, such as is indicated by the outline of the frame 10 of a patent leather repairing machine similar to that shown in my prior patent. Mounted upon this support is a bracket 12, here shown in the form of a ring, pinned at 14 to a stud upon the frame of the machine. The fluid receptacle 16 is provided with an internal sleeve 18 through which passes a pivot rod 20 supported in the ring bracket 12. The enamel may conveniently be introduced into the receptacle by opening the hinged cover 22 and resting the neck of an inverted bottle of enamel (as indicated by dotted lines in Fig. 1) upon the sleeve 18, thereby allowing the contents to drain completely into the receptacle. The provision of the sleeve 18 avoids any possibility of leakage such as might result if the rod 20 passed through bearings in the walls of the receptacle. The receptacle is provided with a lateral extension 24 provided with an outlet passage 26 and the enamel enters this outlet passage through a strainer 28. This strainer is shown in the form of a perforated tube having a beveled end adapted to enter a recess 30 formed adjacent the outlet passage and the tube is laterally removable through another wall of the receptacle in which its head 32 is threaded. This arrangement constitutes a simple and readily cleanable strainer for a device of this kind.

The outlet passage 26 is preferably enlarged at a point intermediate its ends to form a pump chamber 34 which communicates with the passage 26 by means of an inlet opening 36. This pump chamber is closed at its top by means hereinafter described and is provided with an opening 38 in its base communicating with a further extension of the outlet passage which may be termed a valve chamber 40. A screw-threaded recessed plug 42 enables the easy cleaning of this chamber. Mounted for relative movement in the pump chamber is a stem 44 provided with valves 46 and 48 which control the flow of liquid through the opening 38. The opening of the pump chamber 34 is closed by a diaphragm of flexible material, such as the leather disk 50, which is clamped to the upper edge of the chamber 34 by means of a ring 52. This leather disk is pierced for the passage of the valve stem 44 and is held tightly against a shoulder upon said rod for movement therewith by means of a locked nut 54 which also holds a reinforcing disk 51 against the diaphragm. In the end of the strainer tube 28 there is inserted a hollow plug whose lower end is shaped to provide a seat for the ball valve 56. A pin 57 is provided for limiting the movement of the ball away from this seat. The upper end of the rod 44 is hinged to an extension 58 of the bracket 12 so that relative movement of the valves and diaphragm with respect to the receptacle may be effected by movement of the receptacle. It will thus be seen that this diaphragm acts as a pump to draw liquid from the receptacle into the pump chamber and then to expel it positively through the nozzle. By the provision of the upper valve 46, any attempt on the part of the operative to secure a continuous flow of liquid by tying the nozzle in its upper position will be frustrated. Furthermore, the spacing of the valves 46 and 48 acts to predetermine the amount of fluid which shall be expelled by each movement of the nozzle. If it is desired to reduce this quantity of fluid, such a reduction may be effected by means of an adjustable stop 60 in the ring bracket 12 which coöperates with a portion of the extension 24 of the receptacle.

The lower end of the extension 24 inclosing the outlet passage 26 is formed like a spout 62 and has frictionally held therein a nozzle 64. This nozzle is preferably flattened at its end and provided with a slit opening 66 so that the enamel will be spread out in a thin ribbon as it is expelled from the nozzle. Within the spout-shaped portion 62 is a steel ball 68 movable between a valve seat and a cross rod 70.

In the arrangement shown, relative movement of the diaphragm and the valves with respect to the receptacle is caused by manually tipping the nozzle and with it the receptacle upwardly against the action of gravity but obviously any equivalent arrangement may be substituted. Inasmuch as the rod 54 is fixed, this causes the valve 48 to be unseated thereby to open the outlet passage and at the same time to cause the diaphragm 50 to be relatively lowered to expel the enamel positively from the nozzle 66. The disk 51 forms a rigid backing for the leather diaphragm and keeps it from bulging when the fluid contents of the outlet passage are compressed. As soon as pressure is created in the pump chamber, the ball valve 56 will be closed thereby to prevent back pressure in the receptacle and cause the liquid to be expelled through the nozzle. Very soon and at a predetermined time thereafter, the outlet opening 38 will be closed by the other valve 46 thereby to prevent further flow of the liquid. The spacing of these valves is so designed that a sufficient maximum quantity of liquid may be expelled by a single movement of the nozzle. If less than this predetermined amount is desired, the screw stop 60 may be properly adjusted to regulate the amount. The recess in the plug 42 accommodates the valve 48 as the nozzle is raised and at the same time avoids the production of any material head of liquid tending to open the ball valve 68. As the enamel moves outwardly, it pushes the ball 68 away from its seat 70 and opens the passage to the nozzle. When the parts are allowed to return to normal position, the upward movement of the diaphragm 50 sucks up the enamel in the nozzle and the valve chamber 40 and possibly sucks in some from the receptacle itself into the chamber 34. This back movement of the relatively heavy enamel causes the ball 68 to seat itself in the position shown, where it is retained by the atmospheric pressure thereon, there being too small a head of liquid in the chamber 40 to overcome this pressure until the device is again moved and the liquid positively expelled by the action of the pump. It will be noted that the outlet passage is also positively closed by the valve 48 which is held closed by a constant force determined by the action of gravity upon the parts at the right of the pivot 20. Altogether, this arrangement wholly prevents any leakage from the nozzle with its attendant undesirable results.

Upward movement of the nozzle may conveniently be effected by holding the shoe to which the enamel is to be applied directly under the nozzle and lifting the two together thus causing the enamel to be expelled directly upon the shoe and controlling the parts by the work in the quickest possible manner. Because of the slit-shaped opening in the nozzle, the enamel will be delivered in a ribbon-like strip at exactly the desired point thus avoiding any difficulty which might result where the flow controlling member covers a portion of the outlet. In case it is desired to use only a small drop of enamel, this may be readily obtained by a slight upward movement of the nozzle insufficient to expel the enamel in a ribbon-like stream.

Having thus described my invention, what I claim as new and desire to secure by Letters Patent of the United States is:—

1. A dispensing device comprising a fluid receptacle provided with an outlet passage, and relatively movable manually operable means associated with said passage for closing the same against delivery and for positively expelling the liquid from the outlet.

2. A dispensing device comprising a fluid receptacle provided with an outlet passage, separated movable means associated with said passage for closing the same, and movable means for positively expelling liquid from the outlet during the interval between the operation of said closing means.

3. A dispensing device comprising a fluid receptacle having a lateral extension provided with an outlet passage ending in a nozzle, and a pump built into said lateral extension and forming a part of said outlet passage and arranged to be operated through presentation of work to said nozzle to expel positively a portion of the fluid in the receptacle through said passage.

4. A dispensing device comprising a fluid receptacle provided with an outlet passage, spaced mechanically connected valve members located on opposite sides of said passage and relatively movable thereto to close independently the same whereby the flow of liquid during the interval between the operation of said valve members may be predetermined.

5. A dispensing device comprising a fluid receptacle provided with an outlet passage, relatively movable means associated with said passage for positively expelling liquid from the receptacle when moved in one direction, and a valve movable therewith arranged to close the passage against delivery when the expelling means is moved in the other direction.

6. A dispensing device comprising a fluid receptacle provided with an outlet passage, a manually operable valve arranged to prevent and permit selectively the flow of fluid through said passage at an intermediate point thereof, and a fluid-operated valve arranged to control said passage at an extremity thereof.

7. A dispensing device comprising a fluid receptacle provided with an outlet passage, relatively movable means associated with said passage and operable by presentation of the work at the outlet of the passage for drawing the liquid from the receptacle into the passage and positively expelling the same from the outlet thereof, and fluid-operated valves controlling the extremities of said passage and arranged to be opened by an outward flow of liquid.

8. A dispensing device comprising a fluid receptacle provided with an outlet passage, manually operable means associated with said passage for positively expelling liquid therethrough, and a double valve member mechanically connected to said manually operable means and arranged to close said passage when said means is in its extreme positions.

9. A dispensing device comprising a fluid receptacle provided with an outlet passage, a valve in said passage for controlling the flow of liquid therethrough and movable relatively thereto, a diaphragm for said passage arranged to expel liquid from the outlet and means for mechanically connecting said valve and said diaphragm so that said valve is controlled by said diaphragm.

10. A dispensing device comprising a fluid receptacle, manually operable means associated with the outlet of said receptacle for positively expelling a quantity of liquid from the receptacle, flow controlling means movable with the expelling means and means for predetermining the quantity of liquid to be expelled by said manually operable means.

11. A dispensing device comprising a fluid receptacle provided with an outlet passage, and a diaphragm arranged at one side of said passage and relatively movable with respect thereto to vary the cubic content of the outlet passage and thus control the fluid therein.

12. A dispensing device comprising a fluid recepacle provided with an outlet passage, a diaphragm arranged at one side of said passage and relatively movable with respect thereto to vary the cubic content of the outlet passage and thus control the fluid therein, and a rigid backing for a portion of said diaphragm adapted to keep it from bulging as the fluid contents of the outlet passage are compressed.

13. A dispensing device comprising a fluid receptacle provided with an outlet passage which is enlarged to form a chamber, a diaphragm closing one side of the chamber, and a valve in said chamber having a valve rod extending through and being fixed to the diaphragm.

14. A dispensing device comprising a fluid receptacle provided with an outlet passage, movable means comprising a flexible diaphragm associated with said passage and arranged to expel positively the liquid therethrough, and a valve member in the passage controlled directly by said diaphragm.

15. A dispensing device comprising a support, a fluid receptacle mounted on the support and provided with an outlet passage which includes a pump chamber, a movable diaphragm for said chamber directly connected to said support and arranged when moved in one direction to expel fluid from the outlet and when moved in the other direction to suck in the fluid adjacent the outlet, and a valve member in said passage controlled by the movement of the fluid.

16. A dispensing device for relatively viscous liquids comprising a fluid receptacle which is provided with an outlet passage, and relatively movable pumping means for said passage comprising a flexible diaphragm movable to expel and draw in liquid, and a ball valve between said movable means and the outlet arranged to close upon the movement of said means to draw in liquid.

17. A dispensing device comprising a fluid receptacle provided with an outlet passage, a valve member in said passage and movable relatively thereto to control the flow of liquid through the passage, and movable means comprising a diaphragm imperforate for the passage of a fluid, for sucking away from the outlet fluid which has not been completely expelled while said valve was open.

18. A dispensing device comprising a support, a fluid receptacle mounted on said support, a nozzle communicating with said receptacle and movable with relation to said support, and means associated with said nozzle arranged to expel liquid positively through the nozzle when said nozzle is displaced by the application of work thereto and to shut off communication with the nozzle when the latter is allowed to return to its normal position.

19. A dispensing device comprising a support, a fluid receptacle movably mounted thereon and having an extension provided with a normally closed outlet passage, and relatively movable means within said passage arranged to open the same to allow the flow of liquid therethrough upon the application of work to said extension in such a way as to cause movement of said receptacle.

20. A dispensing device comprising a fluid receptacle provided with an outlet passage, a pump member and a valve member movably mounted relative to the receptacle to control the flow of liquid through said passage, and means for causing relative movement of said members and said receptacle upon the application of work to the outlet thereof.

21. A dispensing device comprising a support, a fluid receptacle provided with an outlet passage and movably mounted upon said support, and a pump device arranged in connection with said outlet passage positively to expel fluid therefrom and having one of its elements fixed with relation to said support whereby relative movement of said pump element and the receptacle may be caused by the application of work to the outlet with the result that a portion of the fluid is positively expelled directly upon the work.

22. A dispensing device comprising a support, a fluid receptacle pivotally mounted upon said support and provided with an outlet passage, a nozzle for said outlet passage, a diaphragm associated with said outlet passage having a portion fixed with relation to the support whereby movement of the nozzle by the application of work thereto will cause the diaphragm to positively expel fluid from the nozzle.

23. A dispensing device comprising a support, a fluid receptacle pivotally mounted upon a rod extending laterally from said support, a sleeve within said receptacle inclosing said rod and forming a support for an inverted bottle of liquid, and means responsive to the movement of the receptacle for controlling the flow of liquid therefrom.

24. A dispensing device comprising a support, a bracket upon said support, a fluid receptacle pivoted on said bracket and provided with an outlet passage, and means in said passage mechanically connected to said bracket and relatively movable with respect to said passage for controlling the flow of fluid therethrough.

25. A dispensing device comprising a support, a bracket thereon, a fluid receptacle pivotally mounted upon said bracket, a stop upon the bracket controlling the movement of the receptacle relatively thereto, and means operable by the movement of the receptacle for expelling a predetermined quantity of liquid therefrom, said stop being operable to determine the quantity of fluid expelled from the receptacle.

26. A dispensing device comprising a support, a fluid receptacle pivotally mounted thereon, a lateral extension on said receptacle provided with an outlet passage, a removable strainer in the base of the receptacle communicating with said passage, and means fixed with relation to the support for controlling the flow of liquid through the pivotally movable receptacle.

27. A dispensing device comprising a fluid receptacle provided with an outlet passage, means for closing the passage, means for expelling fluid to the final point of discharge, connections between said means to cause them to act together, and operator-controlled means arranged to produce relative movement between the receptacle and the closing and expelling means.

28. A dispensing device comprising a fluid receptacle provided with an outlet passage, movable means for expelling fluid from the receptacle through the passage to the final point of discharge, a valve for closing the passage, and connections between the expelling means and valve to cause their movement together.

In testimony whereof I have signed my name to this specification.

FREDERICK M. FURBER.